July 17, 1962  L. E. ASKE  3,045,133
LAMINATED MAGNETIC APPARATUS AND METHOD FOR MAKING SAME
Filed Aug. 22, 1958  3 Sheets-Sheet 1

INVENTOR.
LEONARD E. ASKE
BY Roger W. Jensen
ATTORNEY

July 17, 1962 L. E. ASKE 3,045,133
LAMINATED MAGNETIC APPARATUS AND METHOD FOR MAKING SAME
Filed Aug. 22, 1958 3 Sheets-Sheet 2
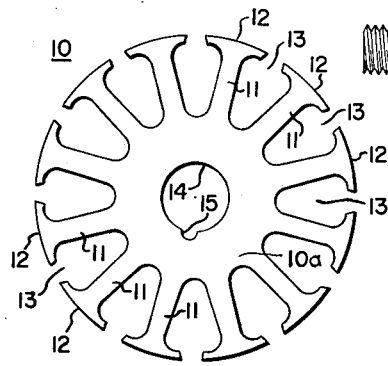
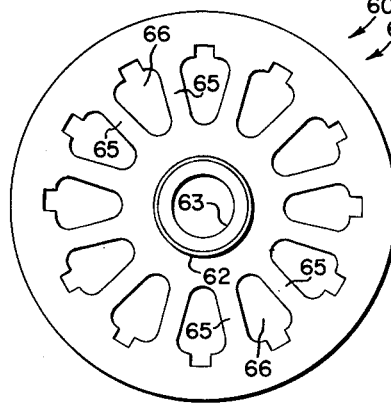
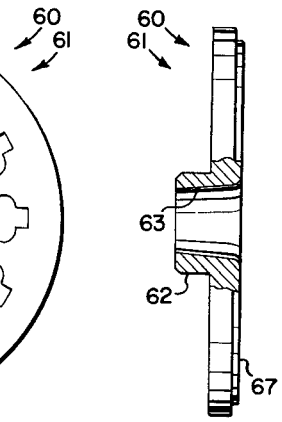
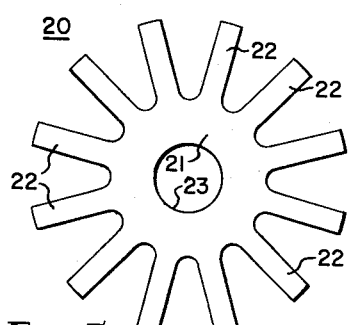
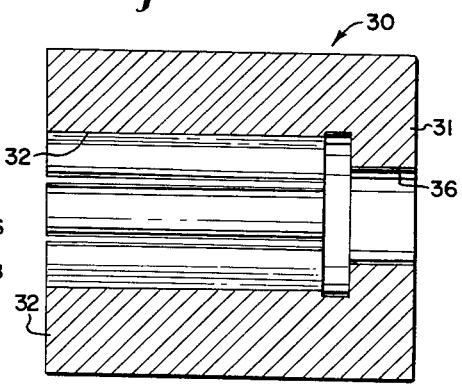
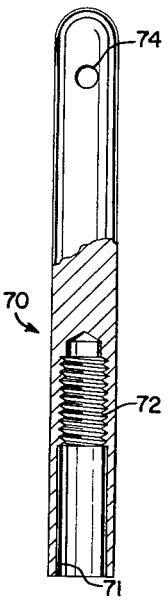
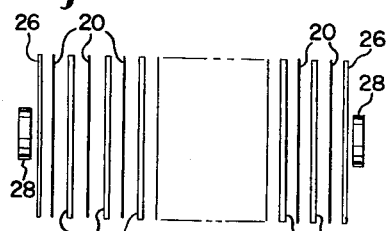
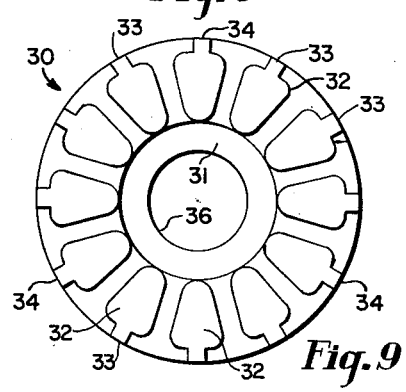
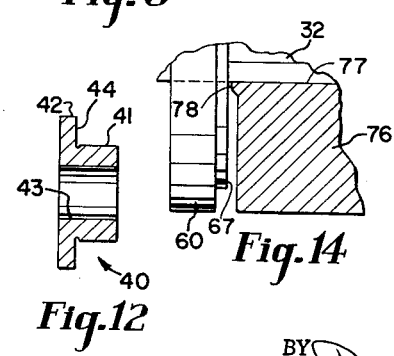
INVENTOR.
LEONARD E. ASKE
BY Roger W. Jensen
ATTORNEY July 17, 1962 L. E. ASKE 3,045,133
LAMINATED MAGNETIC APPARATUS AND METHOD FOR MAKING SAME
Filed Aug. 22, 1958 3 Sheets-Sheet 3

INVENTOR.
LEONARD E. ASKE
BY Roger W. Jensen
ATTORNEY

United States Patent Office 3,045,133
Patented July 17, 1962

3,045,133
LAMINATED MAGNETIC APPARATUS AND
METHOD FOR MAKING SAME
Leonard E. Aske, Minneapolis, Minn., assignor to Minneapolis-Honeywell Regulator Company, Minneapolis, Minn., a corporation of Delaware
Filed Aug. 22, 1958, Ser. No. 756,725
13 Claims. (Cl. 310—43)

This invention pertains to laminated magnetic devices such as rotors and stators for motors and generators and to the method of producing these laminated magnetic devices. More specifically, the invention in one of its aspects is directed to a uniquely bonded magnetic core and to the method of bonding the same. The magnetic core is made up of a plurality of laminations arranged in a stack and is bonded together by means including a relatively thin coating of thermoresponsive material disposed around a substantial part of the exterior surfaces of said stack of laminations. The thermoresponsive material is characterized by having a relatively high cohesion factor. The relatively thin coating of thermoresponsive material around the exterior surfaces of the stack of laminations serves as an encapsulation of the stack of laminations holding the stack in rigid assembled relationship.

Another aspect of the invention is the method of bonding together a stack of laminations comprising the steps of interleaving a plurality of laminations with a plurality of spacers having the same general configuration as the laminations and the spacers in turn being made out of sheets of thermoresponsive material having dispersed therein a substantial number of relatively small non-conductive members or particles, subjecting said interleaved laminations and spacers to heat and to mechanical pressure directed generally perpendicular to the plane of the interleaved laminations and spacers so as to cause said thermoresponsive material to melt, and then cooling the interleaved laminations and spacers. It has previously been taught in the application of Vernon Krueger, Serial No. 737,239, filed May 23, 1958, and assigned to the same assignee as the present application to coat individual laminations prior to the stacking together thereof with a thermoresponsive material having dispersed therein a plurality of relatively small non-conductive particles or members. The present invention is an improvement over said Krueger application in that the thermoresponsive material and spherically shaped particles are processed in sheet form of the desired thickness from which the spacers are punched so as to have the same general configuration as the magnetic laminations. Then the laminations and spacers are assembled in alternate relationship, the spacers being interleaved between the magnetic laminations. The method of punching the spacers out of pre-processed sheets of thermoresponsive material having dispersed therein the spherically non-conductive members is advantageous over said Krueger application in several respects. First of all in said Krueger process it is somewhat difficult to control exactly the thickness of the coating of the thermoresponsive material on the laminations. Further, the coated laminations have to be individually handled and must be dried prior to the bonding process and consequently do not lend themselves well to automated processes. Also it has been found that the present technique develops a much greater bond strength and does a better job of insulating the individual laminations as compared to the Krueger process which applied the adhesive mixture either by a spray, roller coating, or similar process. Further, the Krueger process is limited to thermoresponsive materials that tend to have adhesive qualities so that the material will bond itself to the lamination. In the present arrangement the pre-processed sheet material of thermoresponsive material may be of a variety of forms. It may be adhesive in nature such as Cycleweld, manufactured by the Chrysler Corp., or it may be non-adhesive in nature such as the materials known commercially as Kel-F and Teflon. The present invention provides a means in combination with a fixture which holds the laminations during the bonding process for squeezing out excess thermoresponsive material between the adjacent laminations after the thermoresponsive material has melted and directing the excess thermoresponsive material around a substantial portion of the exterior surfaces of the stack of laminations and controlling the thickness of this exterior coating in such a way that upon cooling the entire stack of laminations is encapsulated with a very thin coating of thermoresponsive material having sufficient cohesive characteristics so that the stack of laminations is bonded together as a rigid assembly. The finished stack of laminations may be considered to be encapsulated or potted by the thermoresponsive material, the encapsulating serving not only as a means for holding the laminations together but also serving as insulation means. In a broad aspect of the invention it is not essential to have the spherically shaped or otherwise shaped non-conductive members dispersed in the thermoresponsive material as far as the bonding together of the stack of laminations is concerned by the thin coating of material on the exterior surfaces of the stack of laminations. However, in another aspect of the invention the spherically shaped or otherwise shaped non-conductive particles or members in combination with the thermoresponsive material serves the valuable function of spacing means between adjacent laminations in the stack of laminations which tends to maintain the laminations in parallel relationship so as to increase radically the permeability of the finished magnetic core and furthermore to maintain an electrical insulation between adjacent laminations so as to reduce eddy current losses to a minimum.

A further aspect of the invention is to provide a unique assembled laminated core and supporting shaft member for use in a device such as a stator member for a gyroscope spin motor wherein the stator is supported on a shaft in a central position with the rotor member of the gyroscope being on the outside of the stator. The present invention provides a laminated magnetic core of this type which comprises a plurality of magnetic laminations each having a central aperture of substantially the same size with the laminations being arranged in a stack with the apertures in alignment. A shaft member having a portion with a circular cross section is positioned with the portion in the apertures and the circular portion is dimensioned so that it is slightly smaller in diameter than the diameter of the apertures. The laminations again are spaced by thermoresponsive insulated film spacers preferably having dispersed therein relatively small insulative spherically shaped particles and the whole assembled stack of laminations, spacers, and shaft are mounted on a suitable fixture with the shaft being held concentric with the outside diameter of the stack. Again, heat and axial pressure are applied to the assembled stack of laminations. The heat tends to melt the thermoresponsive material so as to reduce the axial length of the assembled stack of laminations and spacers. The axial length of the stack of laminations is reduced down to the point until the laminations are spaced apart from one another by a distance approximating the average diameter of the spherically shaped insulative particles dispersed in the thermoresponsive material. The surplus thermoresponsive material having dispersed therein the spherically shaped particles are squeezed out in part into the void spaces between the laminations and the shaft. Preferably the portion of the shaft in the central aperture in the stack is roughened somewhat which, in combination with the spherically shaped particles in the thermoresponsive material, contributes to a good mechanical bond of the shaft to the stack of laminations. The shaft although being mechanically bonded to the stack of laminations upon the cooling of the entire assembly will nevertheless be electrically insulated from the stack of laminations due to the central portion of the shaft being smaller in diameter than the diameter of the apertures in the laminations. This is important for purposes of reducing the eddy current losses in the finished laminated core in contrast to prior art methods wherein a stack of laminations would be separately bonded together and then subsequently pressed onto a shaft. In this prior art technique the pressing of the laminations onto the shaft tended to smear the laminations together and short them out on their inside diameter. Further, the prior art technique generally ground or otherwise machined the outside diameter of the finished stack of laminations which process also usually tends to short out adjacent laminations due to the smearing effect. Thus with the prior art laminations pressed onto a shaft there was a short circuit of the laminations on their outer diameter as well as a short circuit of laminations on their inner diameter completing a complete electrical circuit for the flow of eddy currents with the attendant high losses. With the present arrangement of having the shaft mechanically bonded to the stack of laminations but electrically insulated therefrom there is no complete circuit for eddy currents to flow between adjacent laminations as was the case in the prior art devices and accordingly a superior finished core is produced.

In many cases the laminated core will have a plurality of winding openings which in many cases will be so-called slots between adjacent poles defined on the magnetic core. The present invention provides a unique way of insulating these winding openings and at the same time bonding the laminations together. This is accomplished by having a suitably shaped die or punch or holding fixture holding the laminations in assembled relationship during the heating and pressing part of the process with the die or fixture or punch having arms or fingers extending through the winding openings and generally being spaced from the sides thereof by a very small amount, the fingers or arms of the fixture serving them as a form or mold to cooperate with the excess thermoresponsive material flowing out between the laminations during the heating and pressing operation. The end result is that the very thin coating of thermoresponsive material lining the winding openings contributes in the manner described above to the over-all means of encapsulating the stack of laminations so as to hold it together as a rigid assembly and furthermore the winding openings from an electrical standpoint so that subsequently when windings are wound through the winding opening no additional electrical insulation is needed. This is a distinct advantage over the prior art techniques of providing separate slot liners or the like in the winding openings which have many shortcomings such as cost and the using up of valuable winding space. Another trouble with the prior art technique of using separate slot liners is that occasionally the operator doing the winding will accidentally get a winding turn positioned between the slot liner and the stack of laminations which will tend to short out the entire wound core and cause it to be rejected.

A further aspect of the invention is that the punch or fixture that is used to hold the laminations together may be, if desired, specially designed so as to hold the laminations at three separate zones or points around the outer periphery so as to have the outer diameter of the stack of laminations perfectly aligned. Then the fixture or punch is used in combination with other means for supporting the shaft to which the stack of laminations is to be bonded in such a way that the axis of the shaft is perfectly concentric with the outer diameter of the stack of laminations. It will be understood that it is possible due to inaccuracies in the lamination punch to have a certain amount of eccentricity or run out between the outer diameter of the stack of laminations and the central apertures therein. However, by providing a relatively loose fit between the shaft and the central aperture in the stack of laminations, by holding the axis of the shaft concentric with the outer diameter of the stack of laminations so as to take up any eccentricity or run out in the void space between the shaft and the side walls of the apertures, and by filling the void spaces with the surplus melted thermoresponsive material and insulative particles, a finished laminated core structure is provided including a shaft for supporting same wherein the outer diameter of the stack of laminations is perfectly concentric with the rotational axis of the shaft. Also the laminations in the stack are insulated from one another and the entire stack of laminations is electrically insulated from the shaft but is mechanically connected thereto. The end result of having the outer diameter of the stack of laminations perfectly concentric with the axis of the shaft has the advantage that the usual step of grinding the outside diameter of the stack is eliminated and the resulting smearing or shorting of adjacent laminations on the outer diameter thereof is eliminated. Thus the stack of laminations has a minimum amount of eddy current losses due to (1) the individual laminations being insulated sidewise from one another by the spherically shaped insulative particles dispersed in the thermoresponsive material, (2) the shaft member being insulated from the stack of laminations due to its circular portion being smaller in diameter than the apertures in the laminations, and (3) the outer diameter of the stack being concentric with the axis of the shaft so as to eliminate the usual grinding or other machining of the outer diameter.

Yet another aspect of the invention is a feature usable in combination with the subsequent winding of coils around the pole portions of the laminated core. End insulators of thermoresponsive material are provided on each axial end of the stack of laminations with interleaved spacer insulations. The assembled laminations, spacers, and end insulators are held in a suitable fixture and suitable stripper plate end dies contribute to the application of axial pressure to the assembled stack at the same time that heat is applied to the full assembly. The stripper plate end dies are specially shaped so that they permit axial flash or extrusion of the melted thermoresponsive material, the flash being relatively thin so as to be deformable in response to pressure applied by means such as winding means to be wound subsequently around the full portions of the stack. This axial flash may be trimmed to the proper axial length so as to define shoulders which will permit the winding means to go around the ends of the poles in a rounded manner as opposed to sharp corners so as to eliminate the possibility of breakdown in the windings at that point.

It is an object of this invention therefore to provide improved laminated magnetic cores and to provide improved methods for producing laminated magnetic cores.

Specific objects of this invention will become apparent from a reading of the complete specification and claims in connection with the accompanying drawings in which:

FIGURE 4 is a plan view of a typical lamination;

FIGURE 5 is a plan view of a film spacer adapted to be used with the lamination shown in FIGURE 4 and which also is a plan view of the end insulators;

FIGURE 6 is a stack detail showing the interleaving of film spacers, laminations, and end insulators;

FIGURE 7 is a detailed view of a typical shaft which may be assembled with a group of laminations having a central aperture therethrough, the shaft shown in FIGURE 7 being the one shown in FIGURES 1-3;

FIGURE 8 is a cross-sectional view of a forming punch or stacking fixture suitable for stacking the laminations and film spacers and end insulators shown in FIGURES 4 and 5;

FIGURE 9 is an end view of the punch shown in FIGURE 8;

FIGURE 10 is a side view of a stripper plate die or end plate used in the bonding process;

FIGURE 11 is an end view of the stripper plate die shown in FIGURE 10;

FIGURE 12 is a detailed view of a bushing used in the bonding process;

FIGURE 13 is a detailed view of a shaft extension used in the bonding process;

FIGURE 14 is a detailed view showing the coaction between a spacer ring, the stripper plate, and the punch;

Figure 1:
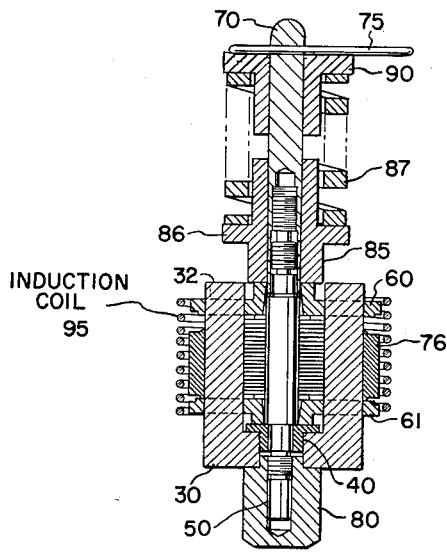
FIGURE 1 shows an assembled stack of laminations, film spacers, and end insulators supported in a suitable fixture and having axial pressure applied prior to the application of heat.

Referring first to FIGURE 4 a typical lamination 10 is shown which comprises a member having a generally circular shape and of course being punched out on conventional magnetic sheet steel of the desired gauge. The individual laminations 10 have a general central hub portion 10a from which extends in radial directions a plurality of pole portions 11 which terminate in pole faces 12, the surfaces of which are arcuate so as to conform with the general configuration of the entire lamination 10. The pole faces 12 generally have a greater arcuate width than the main portion of the poles 11 so as to tend to close off the winding openings 13 defined between each pair of adjacent poles. A central aperture 14 is provided on each lamination 10. A keyway or slot 15 may be provided for use in aligning all of the laminations during the stacking process.

FIGURE 5 shows an end view of a film spacer generally identified by the reference numeral 20 and which generally has a configuration similar to the laminations 10 in that it has a central hub portion 21, a plurality of radially extending pole portions 22 and a central aperture 23. It has been found that it is not necessary to have pole faces on the pole portions 22 similar to pole faces 12 on the laminations 10 due to the melting and compression of the film spacers 20 to be described below. The film spacers 20 are adapted to be punched out of a sheet of suitable thermoresponsive material. The expression "thermoresponsive" is used to denote any suitable material such as a thermoplastic or thermosetting substance which will respond to the application of heat in the manner to be described below. The thermoresponsive material may be of the type known as "Cycleweld" manufactured by the Chrysler Corp. which is both adhesive and cohesive in nature or it may be similar to the materials known as "Kel-F" or "100X Teflon" which are characterized by having a very high cohesive factor but with a very low adhesive factor. In the preferred embodiment of the invention the film of thermoresponsive material has embedded or dispersed therein a substantial number of relatively small insulative particles or members which preferably take the form of spherically shaped glass beads or mica having a nominal diameter of approximately one mil. The film stock from which the individual film spacers 20 are punched preferably has an average thickness of approximately 5 mils. Preferably the concentration of glass bead fill in the film will be between 3 to 5% by weight. The film thickness, fill material size and concentration, it will be understood, may be varied according to the particular device being bonded. The values set forth herein have been found satisfactory for bonding magnetic laminations punched out of stock 0.014 inch thick. It will be understood that some aspects of the present invention contemplate the use of film of thermoresponsive material without additional fill material or dispersed small insulative particles and further that other aspects of the invention contemplate that substitution of other types of fill material for the spherically shaped glass beads. For example, mica powder or dust could be used if desired.

FIGURE 6 is a stack detail showing the interleaved laminations 10 and film spacers 20, a sufficient number of laminations 10 being selected to form a stack of the desired axial length. It will be observed that between each pair of adjacent laminations a film spacer 20 is positioned. It will be shown later that the finished stack of laminations is approximately equal to the summation of the widths of all of the laminations in the stack plus a spacing distance between adjacent laminations of approximately the diameter of the material such as the glass beads or mica insulative particles used as a fill material in the film spacers.

FIGURE 6 further shows an end insulator 26 abutting each axial end of the assembled stack of laminations 10 and film spacers 20. The end insulators 26 have the same general end view configuration as shown in FIGURE 5 for the film spacers 20 and preferably are punched out of sheets of thermoresponsive material such as Kel-F having a thickness somewhat greater than the thickness of the spacers 20. The sheet stock for the end insulators 26 in its preferred form is backed up by one or more layers of a suitable cloth 27 such as fiberglass or asbestos cloth to give the end insulators 26 increased end insulator thickness in the melted state due to the glass or asbestos thickness. (See FIGURE 17.)

Positioned outboard of the end insulators 26 on each end of the stack of assembled laminations and film spacers, FIGURE 6, are a pair of washer like members 28 of thermoresponsive material having suitable apertures therein approximately the same size as the apertures 14 and 23 in the laminations 10 and film spacers 20 respectively.

FIGURES 8 and 9 show cross sectional side views and end views respectively of a forming punch or stacking fixture generally identified by the reference numeral 30. As shown in FIGURE 8 the forming punch 30 has a U-shaped cross section including an end portion 31 from which extend in an axial direction a plurality of fingers or arms 32. Each individual finger or arm 32 has a cross section very similar in shape to the window openings 13 of the laminations 10 but are dimensioned or shaped slightly smaller than the window openings 13 for purposes which will be explained below. Each arm or finger 32 includes a rib 33 on the outer periphery thereof most of which are slightly smaller in arcuate width than the spacing between adjacent pole faces 12 on the individual laminations 10. However, three of the ribs specially identified by the reference numeral 34 and positioned approximately 120° apart from one another about the periphery of the forming punch 30 are slightly wider in arcuate width than the remaining ribs 33 and are specially dimensioned so as to fit very tightly between the pole faces 12 of the laminations 10. It will be observed later than the three ribs 34 serve as a means of positioning the individual laminations 10 on the forming punch 30 in such a way that the outer diameter of the stack of laminations 10 is maintained concentric with the centerline of the forming punch 30. The forming punch 30 further includes in its end portion 31 a central aperture 36 in which is adapted to be fitted a bushing member 40 shown in cross section in FIGURE 12. Bushing 40 has a main portion 41 having a diameter selected so that it may be snugly positioned in aperture 36 of the forming punch 30. A collar or shoulder 42 extends out beyond surface 41 in a radial direction. An axial surface 44 is defined on the outboard end of shoulder 42. Bushing 40 further includes a central aperture 43 therethrough which is adapted to snugly embrace a journaled surface 51 on a shaft member 50 shown in FIGURE 7, shaft 50 including in addition to the journaled surface 51 a second journaled surface 52 near the other end thereof, a central portion 53 having a circular cross section separating the journaled areas 51 and 52. Outboard of journal portion 51 is a threaded portion 54 and outboard of journal portion 52 is a pair of threaded portions 55 and 56. Preferably the diameters of threaded portions 54, 55, 56 are slightly less than the diameter of the journal portions 51 and 52 and further the diameter of the central portion 53 is somewhat greater than the diameter of the journal portions 51 and 52. The diameter of the central portion 54 is selected so that it is slightly smaller than the diameter of the apertures 14 and 23 in the laminations 10 and spacers 20 respectively. The critical relationship is that the diameter of the shaft 53 be less than the diameter of aperture 14 in the laminations 10 so that there is no direct metal to metal contact between the shaft 50 which normally is of an electrical conductive material such as steel and the laminations 10 which of course are conductive.

A pair of stripper plate end dies (see FIGURES 1, 2, 3, 10 and 11) are used in the preferred embodiment of the invention in part for compressing the ends of the assembled stack of laminations, film spacers, and end insulators, the stripper plate dies being identified by reference numerals 60 and 61. Generally the stripper plate dies 60 and 61 are identical to each other and the details thereof are shown in FIGURES 10 and 11. It will be noted that generally each stripper plate is a generally flat member having a generally circular configuration, a central hub portion 62 being provided as well as a tapered aperture 63 being centrally positioned in the plate. The hub portions 62 of the stripper plates 60 and 61 are connected to the outer periphery of the plates by a plurality of pole portions or ribs 65 which define therebetween openings or apertures 66 which are slightly larger than the window openings 13 in the laminations 10. It will be understood that the number of ribs 65 in the stripper plates 60 and 61 corresponds to the number of poles 11 and 22 in the laminations 10 and in the film spacers 11 and end insulators 26 respectively. The stripper plates 60 and 61 are provided on their inboard surfaces with a substantially flat face 67 of slightly smaller diameter than the main body of the stripper plates.

FIGURE 13 is a detailed view of a shaft extension member generally identified by reference numeral 70 one end of which includes a central recessed aperture or bore 71 the inner portion of which is threaded as at 72. The opposite end of shaft 70 includes a transverse aperture 74 through which is adapted to extend a suitable pin member 75 (see FIGURES 1 and 2).

A spacer ring 76 is provided between the stripper plates 61 and 60 and has a generally annular configuration with an inner diameter 77 which permits it to snugly encompass the fingers 32 of the forming punch 30. As shown in FIGURE 14 the spacer ring 76 on the outboard surfaces thereof includes a central axial projection or shoulder 78 the purpose of which is to localize the area of contact and pinch off excess melted material between the stripper plates 60 an 61 and the spacer ring 76 during bonding procedures.

Figure 2:
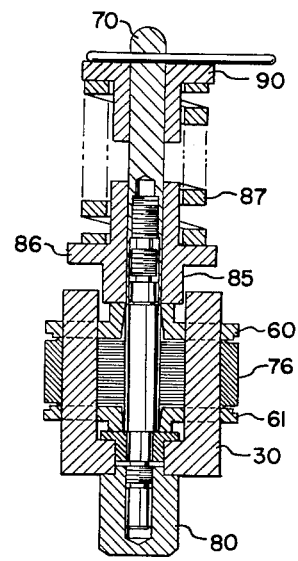
FIGURE 2 is the same assembly shown in FIGURE 1 subsequent to the application of heat which causes the film spacers and end insulators to melt, the axial pressure having reduced the axial length of the stack.
Figure 3:
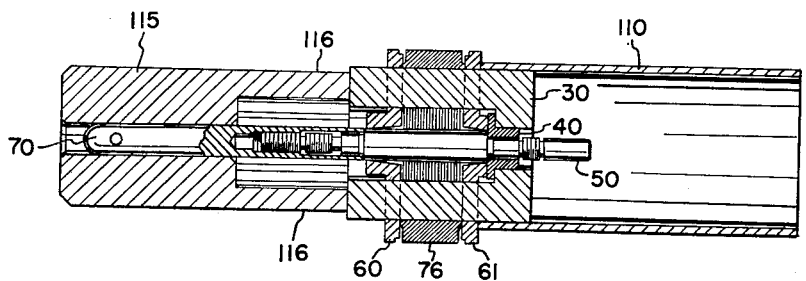
FIGURE 3 is a view of the bonded stack on the punch in combination with special means provided for separating the punch from the bonded laminated stack.

Referring now to FIGURES 1, 2 and 3 the successive steps of bonding the laminations 10 together into a rigid structure are shown. FIGURE 1 depicts the stack of laminations, film spacers 11, end insulators 26 and end washers 28 in assembled relationship on the central portion 53 of shaft 50. The forming punch 30 is shown with its plurality of arms or fingers 32 extending through the winding openings in the laminations, film spacers, and end insulators. The bushing 40 is positioned within the aperture 36 in the forming punch 30 with the collar 42 on the bushing having its axial surface 44 thereof abutting against the inboard side of end 31 of the forming punch 30. The shaft member 50 is positioned so that the journaled surface 51 is fitted into the aperture 43 of the bushing 40 and the shaft 50, bushing 40, and forming punch 30 are all held in assembled relationship by a nut member 80 which is screwed onto the threaded portion 54 of shaft 50 as is shown in FIGURES 1 and 2. It will be observed that nut member 80 has a shoulder portion thereon which cooperates with the collar or shoulder 42 on the bushing 40 to clamp these members to the forming punch 30. The outer diameter of the forming punch as defined by the outer periphery of the ribs 34 thereon is maintained exactly concentric with the center line or axis of the shaft 50 due to precise location of the apertures 36 and 43 in the forming punch 30 and bushing 40 respectively. It will be observed that the stripper plate 61 is positioned so that its hub portion 62 abuts the inboard surface of the bushing 40 and then the assembled stack of laminations 10, film spacers 20, end insulators 26, and end washers 28 as shown in FIGURE 6 are positioned around the central portion 53 of the shaft 50. As a preliminary step prior to placing the assembled stack of laminations 10, end insulators 26, film spacers 20, and end washers 28 on the shaft 50 the shaft extension 70 is first screwed on to the end of shaft 50 including the threaded portions 55 and 56. Generally the outer diameter of the shaft extension 70 is the same as the diameter of the central portion 53 of the shaft 50 so that when assembled together there is a continuous surface provided of the diameter of the central portion 53. After the entire assembled stack as shown in FIGURE 6 is mounted on the shaft 50 then the second stripper plate 60 is positioned with its surface 67 abutting against the outboard surface of the top end washer 28 and with its hub portion 62 extending outboard. Abutting against the hub portion 62 of the stripper plate 60 is a special collar 85 (see FIGURES 1 and 2) having an aperture therethrough so as to permit the collar 85 to snugly embrace the shaft extension 70. The collar 85 further has a shoulder 86 thereon which serves as an abutment for one end of a compression coil spring 87, having a suitable spring rate, the other end of which is abutted against a second collar member 90 having a suitable shoulder thereon as well as having an aperture which permits it to slide onto the shaft extension 70. In practice an arbor press or the like would be used to compress the spring member 87 so that the desired amount of pressure would be applied from the spring through collar 85, stripper plate 60 to the assembled stack of laminations, film spacers, end insulators, and end washers. For one application a spring pressure of approximately 150 pounds per square inch on the assembled laminations was found to be satisfactory. After the desired amount of compression to spring 87 has been accomplished then pin member 75 is extended through aperture 74 in the shaft extension 70 so as to hold or maintain the spring pressure. It will be understood that the location of aperture 74 is predetermined according to the desired spring pressure.

Means for heating the assembled laminations and thermoresponsive means on the stacking fixture are provided and as shown in FIGURE 1 this heating means may take the form of an induction coil 95. It will be further understood that other heating means such as forced air ovens or the like can be used for applying heat to the assembled lamination stack.

As explained in FIGURE 1 the assembled laminations, film spacers 11, end insulators 26, and end washers 28 are shown prior to the application of heat. In FIGURE 2 the assembled elements of the core are shown subsequent to the application of heat from the induction coil means 95. A temperature high enough to melt the thermoresponsive means in the film spacers 11, end insulators 26 and end washers 28 is produced by the induction coil means 95. It will be noted in FIGURE 2 that the axial length of the assembled stack of laminations is shorter than as shown in FIGURE 1. As explained this decrease in axial length is due for the most part to the film spacers 11 being punched out of sheets of thermoresponsive material having a greater thickness than the nominal diameter of the spherically shaped glas beads dispersed through the thermoresponsive material. Consequently, when the film spacers 11 are melted by the application of heat, the axial force applied by compression spring 87 displaces the laminations axially towards one another, this axial displacement being limited by the spherically shaped glass beads dispersed throughout the thermoresponsive material. Also the melting of the end insulators 26 and end washers 28 contributes to the reduction of axial length.

The insulative end washers 28 made out of the thermoresponsive material are provided so as to provide a supply of thermoresponsive material to fill up the void space between the portion 53 of shaft 50 and the tapered apertures 63 in the stripper plates 60 and 61. The thermoresponsive material htat flows into this void space is identified in FIGURE 17 by the reference numeral 63'.

Figure 17:
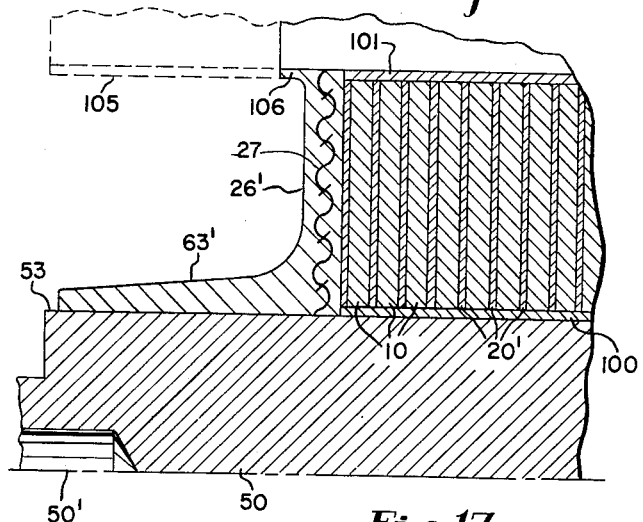
FIGURE 17 is a cross sectional detail view of the assembled laminations and shaft showing the end insulators and shoulders formed thereon as viewed along section lines 17—17 of FIGURE 16.

Referring again to FIGURE 17, which is a cross section of part of the finished laminated core structure bonded to the shaft, it will be noted clearly that there is no direct electrical connection between the shaft 50 and the individual laminations 10, this as indicated being due to the apertures 14 in the laminations 10 being larger than the diameter of portion 53 of the shaft 50 and further to the laminations and shaft being held by the holding fixture including the forming punch 30 in such a way that the shaft axis identified in FIGURE 17 by the reference numeral 50' is maintained coaxial with the outer diameter of the stack of laminations. It will be understood that when the stack of laminations has heat and axial pressure applied to it so as to compress the laminations towards one another as shown in FIGURE 2 that the surplus thermoresponsive material having dispersed therein the glass beads tends to flow from between the adjacent laminations 10 in the radial direction both inwardly and outwardly. As it flows inwardly the fluid thermoresponsive material having dispersed therein the spherical glass beads will fill up any void spaces between the shaft and the laminations, this being identified in FIGURE 17 by the reference numeral 100. The thin coating 100 of the thermoresponsive material and glass beads between the laminations 10 and the shaft 50 contributes to the bonding from a mechanical standpoint of the laminations to the shaft, the roughened surface 53 on the shaft also contributing to the bond. The individual laminations 10 as shown in FIGURE 17 are spaced away from one another by what remains of the thermoresponsive film spacers 20, it being understood that the spacing between the laminations 10 as shown in FIGURE 17 is less than the nominal thickness of the film spacers 20 prior to the application of heat and pressure. Consequently the spacing between the laminations 10 in FIGURE 17 has been designated by reference numeral 20' thus indicating a reduction in the effective thickness of the film 20 subsequent to the application of heat and axial pressure. It will be understood that the final thickness of 20' or in other words the distance between the laminations 10 as shown in FIGURE 17 will be controlled to a large extent by the nominal diameter of the spherically shaped glass beads which, as indicated, in the preferred form have a nominal diameter of one mil.

The outward radial flow of the melted thermoresponsive means flows from between the laminations 10 and abuts against the fingers 32 of the forming punch member 30. It will be recalled that the fingers 32 on the forming punch 30 are generally similarly shaped to the windows 13 in the laminations 10 with the exception that they are slightly smaller. Thus there is a very narrow gap on the order of a few mils between the fingers on the forming punch and the winding openings in the stack of laminations 10. The thin coating of thermoresponsive material having dispersed therein the spherical glass beads so left between the fingers 32 on the forming punch 30 and the winding openings 13 of the laminations 10 is identified in FIGURE 17 by the reference numeral 101. It will be understood that the lining or thin coating 101 lines substantially all of the window openings 13 in the stack of laminations. Further, there may be surplus melted thermoresponsive material flowing out to the extreme radial surfaces or on the pole faces 12 of the laminations 10. Then, depending upon the closeness of the fit between the spacer ring member 76 and the pole faces 12 of the laminations 10, there may be a very slight coating of thermoresponsive material thereon. Generally, this coating would not be wanted and if desired it can be removed relatively easily by using an abrasive blast process directed against the radial pole faces 12.

It will be understood that during the application of heat and pressure to the assembled stack of laminations 10, film spacers 20, end insulators 26, and end washers 28, that the film spacers 20, the end insulators 26, and end washers 28 all change to the fluid state at approximately the same time. The application of axial pressure at this time as pointed out above forces the end washers into the shape 63' and also is effective for squeezing out surplus melted thermoresponsive material between the laminations 10 so as to leave remaining films or coating 20' between the laminations. Further, it will be understood that the end insulators 26 or thermoresponsive material will also tend to be compressed at this time. To avoid them being completely compressed by the application of pressure it has been found desirable as indicated to have a backing or fill material 27 such as a glass cloth laminate or asbestos cloth as an integral part of the stack from which the end insulators 26 are punched. The somewhat compressed end insulator 26 is shown in FIGURE 17 by the reference numeral 26'. The substantially simultaneous melting of the end washers 28, end insulators 26, and the film spacers 20, tends to cause the molecules thereof to comingle with one another in their common areas of contact so that when the complete assembly cools the film or thin coating 100 between the laminations and the shaft 50 is bonded at its ends to the end insulators 26 and the coating 101 lining the winding openings in the stack of laminations is also integrally bonded to the end insulators 26. The coatings 101 and 100 are also bonded to the thin coating of thermoresponsive material and glass beads 20' between the adjacent laminations 10. The cohesive interbonding between coatings 100, 101, and the end insulators 26 maintains the whole assembly as a rigid unitary structure.

It has been pointed out above that the stripper plates 60 and 61 have ribs 65 therein which are somewhat smaller in arcuate width than the pole portions 11 on the laminations 10 resulting in the openings 66 in the stripper plates being somewhat larger than the winding openings 13 in the stack of laminations. The significance of this is that during the process of applying heat and pressure to the assembled stack of laminations, etc. the spacing between the fingers 32 of the forming punch 30 and the sides of the openings 66 and the stripper punches 60 and 61 provides a zone into which is extruded the surplus melted thermoresponsive material which is not used in filling up the voids between the laminations and the fingers 32 of the forming punch 30 so as to form coating 101. The extrusion may be identified as a flash which will have an axial extent depending upon the amount of surplus or excess melted thermoresponsive material, this flash being identified in FIGURE 17 by the reference numeral 105. It will be understood that the flash 105 will tend to outline the winding openings 13 and in a sense serve as axial extensions of the coating 101 lining the winding openings 13. This outlining effect is clearly shown in FIGURE 16 which is an end view of the bonded laminated stack shown in FIGURE 15. A portion of the flash 105 is preferably removed by a suitable means such as a high speed slitting saw so as to leave a small shoulder 106 which provides, when winding means are wound around the pole portions 11 of the stack in the winding openings 13, a means for making rounded corners for the windings. It will be appreciated that the relatively axial or longitudinally extending flash portions 106 or shoulders 106 will be slightly deformable in the transverse or radial direction in response to pressure applied in that direction by windings being wrapped around the pole portions 11. Thus as an integral part of the means encapsulating and bonding together the stack of laminations 10 a means is provided for protecting winding means from being bent around sharp corners with the attendant possibility of breakdown in the windings and failure of the device.

FIGURE 3 shows a bonded core ready for removal from the forming punch 30. In this step the nut member 80 has been removed from one end of the shaft 50 and the collars 85 and 90 as well as pin 75 and spring 87 have been removed from the other end of the shaft. A special stripper sleeve member 110 having an inner diameter large enough to receive the forming punch 30 is abutted at one end against the outboard surface of the stripper plate 61 and a special stripper punch member 115 is mounted on the shaft extension 70 with a plurality of fingers 116 thereon engaging the outboard ends of the fingers 32 on the forming punch 30. The assembly as shown in FIGURE 3 then has force applied so as to push stripper punch 115 toward the striper sleeve 110. The action of this is to strip or push the forming punch 30 out of the stack of laminations at which point the stripper plates 60 and 61 may be removed as well as the spacer ring 76.

Figure 15:
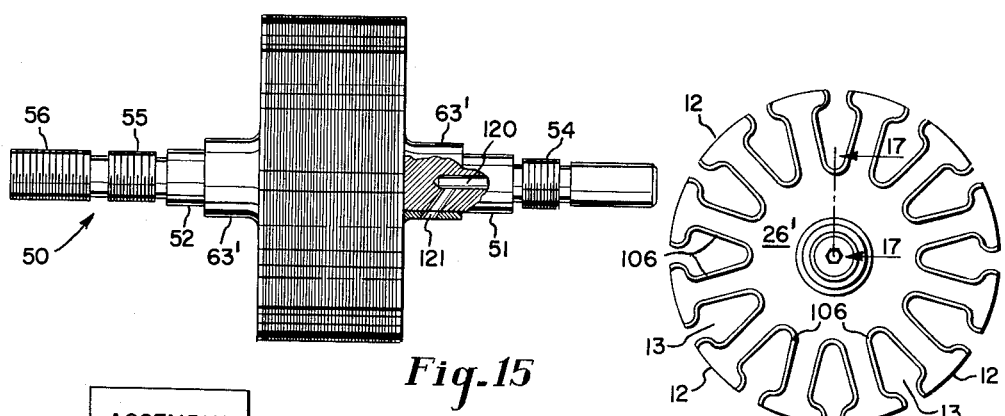
FIGURE 15 is a view of the assembly of the stack of laminations on the shaft.
Figure 16:
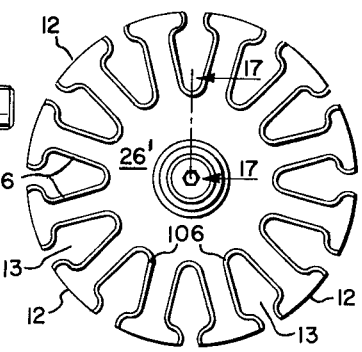
FIGURE 16 is an end view of the assembly shown in FIGURE 15.

In FIGURE 15 a completed bonded laminated magnetic core structure is shown, the stack of laminations being bonded to the shaft member 50. Shaft 50 is shown at the right end in FIGURE 15 to have a central aperture 120 terminating in a generally radial port 121. The function of aperture 120 and port 121 is to provide a passageway for suitable leads for winding means to be wound around the pole portions 11 of the stack.

Figure 18:
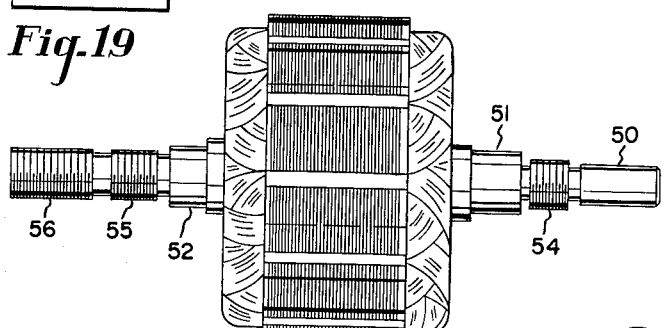
FIGURE 18 is a view of a finished laminated core structure mounted on a shaft including winding means thereon.

FIGURE 18 depicts a laminated core complete with winding means thereon, the winding means being wound about the individual pole portions 11 of the stack of laminations and being pressed into the desired configuration on the axial ends thereof and the whole assembly being vacuum impregnated with a suitable means such as epoxy resin.

Figure 19:
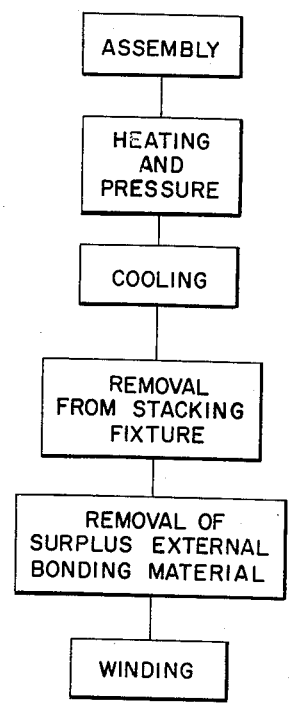
FIGURE 19 is a flow chart showing the steps in the method of bonding the laminations.

FIGURE 19 depicts a flow chart for the above described process. The steps in the process briefly summarized include the assembling of a stack of components as shown in FIGURE 6 together with the holding fixture as shown in FIGURE 1; applying heat and axial pressure to the assembled fixture and lamination stack; cooling which may be accelerated by a waterbath; removing the stack of laminations from the stacking fixtures such as by means as shown in FIGURE 3; removing surplus external bonding material such as the removal of the flash 105 leaving the shoulders 106 and the removal of any thermoresponsive material on the pole faces 12 by the abrasive blast described above; and winding and impregnating.

It will be understood that the present invention may be practiced on a variety of laminated magnetic cores taking a wide variety of configurations. It will be understood that the individual configurations of the laminations by themselves do not limit the scope of the invention, the invention being shown in connection with a lamination having a central aperture therein but it will be understood that the invention may be practiced on laminations without any such aperture. I desire it to be understood therefore, that the scope of the invention should be interpreted not in light of the specific example shown and described in this specification but only as interpreted by the scope of the appended claims.

What I claim is:

1. A laminated magnetic core comprising a plurality of magnetic laminations each having a plurality of winding openings, said laminations being arranged in a stack with said winding openings being in substantial alignment; and means bonding said laminations together into a unitary structure including a relatively thin coating of thermoresponsive insulating material between said laminations and lining substantially all of said winding openings of said stack of laminations, said thermoresponsive material being characterized by having the property of cohesion, said thin coating of said thermoresponsive insulating material in said winding openings serving as a winding opening insulation so as to eliminate the need in combination with winding means of a separate winding opening insulation means, and said thin coating of thermoresponsive material between said laminations being integrally connected to said thin coating of thermoresponsive material lining said winding openings.

2. A laminated magnetic core comprising a plurality of magnetic laminations arranged in a stack; and means bonding said laminations together into a unitary structure including a relatively thin layer of thermoresponsive material disposed between said laminations and coating a substantial portion of the exterior surfaces of said stack of laminations, said laminations being held in rigid assembled relationship by said relatively thin coating of said thermoresponsive material, and said thin layer of thermoresponsive material between said laminations being integrally connected to said thin layer of thermoresponsive material on said exterior surfaces of said stack.

3. A laminated magnetic core comprising a plurality of magnetic laminations each having a plurality of winding openings, said laminations being arranged in a stack with said winding openings being in substantial alignment; and means bonding said laminations together into a unitary structure and for electrically insulating adjacent laminations including a relatively thin coating of thermoresponsive insulative material having dispersed therein a substantial quantity of relatively small insulative particles, said thin coating being disposed between adjacent laminations and lining substantially all of said winding openings.

4. A laminated magnetic core comprising a plurality of magnetic laminations each having a plurality of winding openings, said laminations being arranged in a stack with said winding openings being in substantial alignment; and means bonding said laminations together into a unitary structure and for electrically insulating adjacent laminations including a layer of thermoresponsive material on each end of said stack and a relatively thin coating of thermoresponsive insulative material having dispersed therein a substantial quantity of relatively small spherically shaped insulative particles, said thin coating being disposed between adjacent laminations and lining substantially all of said winding openings, said thermoresponsive material being characterized by having a relatively high cohesion factor and a relatively low adhesion factor, said thin coating lining substantially all of said winding openings being joined to said layer of thermoresponsive material on each end of said stack thus constituting a means sufficient to hold said stack of laminations together as a rigid assembly, and said thin coating lining substantially all of said winding openings constituting a winding opening insulation so as to eliminate the need in combination with winding means of separate winding opening insulation means.

5. A laminated magnetic core comprising a plurality of magnetic laminations arranged in a stack having two ends and longitudinal surfaces; and means bonding said laminations together into a rigid unitary structure including a layer of thermoresponsive material on each of said ends of said stack and a relatively thin coating of thermoresponsive material in which is dispersed a substantial number of relatively small insulative members disposed between adjacent laminations and adjacent to substantial portions of said longitudinal surfaces, said particles being characterized by being of substantially the same size, said laminations being spaced apart in substantial parallel relationship by said particles, and said thin coating of said thermoresponsive material and said particles on said surfaces being joined to said layers of thermoresponsive material on said ends.

6. A laminated magnetic core comprising a plurality of magnetic laminations arranged in a stack in substantial alignment; and means bonding said laminations together into a unitary structure including a substantial number of relatively small insulative members dispersed in a thermoresponsive material, said material and said members being disposed between said laminations and around a substantial portion of the exterior surfaces of said laminations in a relatively thin coating, said particles being characterized by having a circular cross-section and said laminations being spaced apart a distance substantially the same as the diameter of said circular cross-section.

7. A laminated magnetic core comprising a plurality of magnetic laminations arranged in a stack in substantial alignment; and means bonding said laminations together into a unitary structure including a substantial number of relatively small insulative members dispersed in a thermoresponsive material, said material and said members being disposed between said laminations and around substantial portions of the exterior surfaces of said stack of laminations in a relatively thin coating, said particles being characterized by being generally of the same size, and said laminations being spaced apart in parallel relationship by said members.

8. A laminated magnetic core comprising a plurality of magnetic laminations each having a circular aperture therein of substantially the same size arranged in a stack with said apertures in substantial alignment; an electrically conductive shaft member having a roughened portion with a circular cross-section positioned in said apertures with said portion being slightly smaller in diameter than the diameter of said apertures; and means for bonding said laminations together into a unitary structure and for mechanically bonding but electrically insulating said laminations and said shaft; said bonding means including a substantial number of relatively small insulative spherically shaped particles dispersed in a thermoresponsive material with said material and said particles being disposed between said laminations, between said laminations and said portion of said shaft, and around exterior surfaces of said laminations.

9. A laminated magnetic core comprising a plurality of magnetic laminations each having an aperture therein of substantially the same size arranged in a stack with said apertures in substantial alignment; an electrically conductive shaft member having a portion positioned in said apertures with said portion being slightly smaller than said apertures; and means for bonding said laminations together into a unitary structure and for mechanically bonding but electrically insulating said laminations and said shaft; said bonding means including a substantial number of relatively small insulative members dispersed in a thermoresponsive substance with said substance and said members being disposed between said laminations, between said laminations and said portion of said shaft, and around exterior surfaces of said laminations.

10. A laminated magnetic core comprising a plurality of magnetic laminations each having an aperture therein, said laminations being arranged in a stack with said apertures being in substantial alignment; an electrically conductive shaft member having a portion positioned within said apertures; and means for bonding said laminations together into a unitary structure and for mechanically bonding but electrically insulating said laminations and said shaft; said bonding means including a substantial number of relatively small insulative particles dispersed in a thermoresponsive substance having cohesive properties but having substantially little adhesive properties with said substance and said particles being disposed between said laminations, between said laminations and said portion of said shaft, and around exterior surfaces of said laminations.

11. A laminated magnetic core comprising a plurality of magnetic laminations each having an aperture therein of substantially the same size arranged in a stack with said apertures in substantial alignment; a shaft member having a portion positioned in said apertures with said portion being slightly smaller than said apertures; and means for mechanically bonding but electrically insulating said laminations and said shaft; said bonding means including a substantial number of relatively small insulative particles dispersed in a thermoresponsive material with said material and said particles being disposed between said laminations and between said laminations and said portion of said shaft.

12. A laminated magnetic core comprising a plurality of magnetic laminations each having a plurality of winding openings, said laminations being arranged in a stack having two ends with said winding openings being in substantial alignment; means bonding said laminations together into a rigid structure including a layer of thermoresponsive insulative material on each of said ends of said stack, and a relatively thin coating of thermoresponsive material in which is dispersed a substantial number of relatively small spherically shaped insulative members disposed between adjacent laminations and lining substantially all of said winding openings, said thermoresponsive material being characterized by having a relatively high cohesion factor and a relatively low adhesion factor, and said thin coating lining substantially all of said winding openings being joined to said layer of thermoresponsive material on each end of said stack thus constituting a means sufficient to hold said stack of laminations together as a rigid assembly and further constituting a winding opening insulation so as to eliminate the need in combination with winding means of separate winding opening insulation means; and deformable shoulder portions of said thermoresponsive material on the ends of said stack of laminations being integrally formed with said layers on said ends, being positioned immediately adjacent to said winding openings and serving as longitudinal extensions of said thin coating in said winding openings, said shoulder portions yielding somewhat in the transverse directions when winding means are disposed in said winding openings so as to provide rounded corners on the ends of said stacks.

13. A laminated magnetic core comprising a plurality of magnetic laminations each having a plurality of winding openings, said laminations being arranged in a stack having two ends with said winding openings being in substantial alignment; means bonding said laminations together into a rigid structure including a layer of thermoresponsive insulative material on each of said ends of said stack, and a relatively thin coating of thermoresponsive material lining substantially all of said winding openings, said thermoresponsive material being characterized by having a relatively high cohesion factor, and said thin coating lining substantially all of said winding openings being joined to said layer of thermoresponsive material on each end of said stack thus constituting a means sufficient to hold said stack of laminations together as a rigid assembly and further constituting a winding opening insulation so as to eliminate the need in combination with winding means of separate winding opening insulation means; and deformable shoulder portions of said thermoresponsive material on the ends of said stack of laminations being integrally formed with said layers on said ends, being positioned immediately adjacent to said winding openings and serving as longitudinal extensions of said thin coating in said winding openings, said shoulder portions yielding somewhat in the transverse directions when winding means are disposed in said winding openings so as to provide rounded corners on the ends of said stacks.

References Cited in the file of this patent

UNITED STATES PATENTS

| | | |
|---|---|---|
| 2,221,983 | Mayer et al. | Nov. 19, 1940 |
| 2,232,812 | Studer | Feb. 25, 1941 |
| 2,483,024 | Roters | Sept. 27, 1949 |
| 2,763,916 | Korski | Sept. 25, 1956 |